(12) United States Patent
Martin

(10) Patent No.: US 11,155,345 B2
(45) Date of Patent: Oct. 26, 2021

(54) SIDE FOLDING AND REFORMING LINKAGE FOR LANDING GEAR

(71) Applicant: GOODRICH CORPORATION, Charlotte, NC (US)

(72) Inventor: Dennis W. Martin, Woodinville, WA (US)

(73) Assignee: Goodrich Corporation, Charlotte, NC (US)

( * ) Notice: Subject to any disclaimer, the term of this patent is extended or adjusted under 35 U.S.C. 154(b) by 165 days.

(21) Appl. No.: 16/680,285

(22) Filed: Nov. 11, 2019

(65) Prior Publication Data

US 2021/0139136 A1 May 13, 2021

(51) Int. Cl.
| | | |
|---|---|---|
| *B64C 25/14* | (2006.01) | |
| *B64C 25/20* | (2006.01) | |
| *B64C 25/12* | (2006.01) | |
| *B64C 25/26* | (2006.01) | |
| *B64C 25/58* | (2006.01) | |

(52) U.S. Cl.
CPC .............. *B64C 25/20* (2013.01); *B64C 25/12* (2013.01); *B64C 25/26* (2013.01); *B64C 25/58* (2013.01)

(58) Field of Classification Search
CPC ................................ B64C 25/20; B64C 25/14
See application file for complete search history.

(56) References Cited

U.S. PATENT DOCUMENTS

| | | | |
|---|---|---|---|
| 3,198,461 A | 8/1965 | Beach | |
| 3,951,361 A | 4/1976 | Hrusch | |
| 4,132,376 A * | 1/1979 | Sharples | B64C 25/20 244/104 R |
| 4,189,117 A | 2/1980 | Masclet et al. | |
| 4,345,727 A * | 8/1982 | Brown | B64C 25/12 244/102 R |
| 5,022,609 A | 6/1991 | Cranston | |
| 6,805,320 B2 * | 10/2004 | Derrien | B64C 25/10 244/102 A |
| 6,824,100 B1 | 11/2004 | Cheetham | |
| 8,070,094 B2 * | 12/2011 | Collins | B64C 25/12 244/102 A |
| 8,752,785 B2 * | 6/2014 | Wilson | B64C 27/00 244/17.17 |
| 2006/0006282 A1 | 1/2006 | Mellor et al. | |

(Continued)

FOREIGN PATENT DOCUMENTS

| | | |
|---|---|---|
| EP | 3486166 | 5/2019 |
| EP | 3628592 | 4/2020 |

(Continued)

OTHER PUBLICATIONS

European Patent Office, European Search Report dated Apr. 1, 2021 in Application No. 20201349.6.

*Primary Examiner* — Brian M O'Hara
(74) *Attorney, Agent, or Firm* — Snell & Wilmer L.L.P.

(57) ABSTRACT

A system for use with a landing gear of an aircraft includes a drag brace assembly having an upper end configured to be rotatably coupled to the aircraft and a lower end configured to be rotatably coupled to a shock strut of the landing gear. The system further includes a jury linkage having a brace portion configured to be pivotally coupled to the drag brace assembly and a strut portion pivotally coupled to the brace portion and configured to be rotatably coupled to the shock strut.

17 Claims, 4 Drawing Sheets

(56) References Cited

U.S. PATENT DOCUMENTS

2013/0341457 A1 12/2013 Wilson
2015/0069178 A1* 3/2015 Brown .................... B64C 25/12
244/102 R

FOREIGN PATENT DOCUMENTS

FR 2139182 1/1973
WO 2014083170 6/2014

* cited by examiner

SIDE FOLDING AND REFORMING LINKAGE FOR LANDING GEAR

FIELD

The present disclosure relates to landing gear for aircraft and, more particularly, to a reforming linkage to facilitate a side-folding landing gear.

BACKGROUND

Many aircraft include landing gear having wheel assemblies to allow the aircraft to travel along the ground during taxi, takeoff, and landing. Such landing gear may maneuver between a down and locked position, in which the aircraft may rest upon the landing gear, and a stowed position, in which the landing gear is retracted into a compartment within the aircraft. With the advent of flying wing aircraft and very high speed aircraft, it is desirable to reduce the size of such landing gear compartments (in addition to a general desire to reduce the size of aircraft components). Due to this reduction of compartment sizes, it is likewise desirable to reduce a size of stowed landing gear.

SUMMARY

Disclosed herein is a system for use with a landing gear of an aircraft. The system includes a drag brace assembly having an upper end configured to be rotatably coupled to the aircraft and a lower end configured to be rotatably coupled to a shock strut of the landing gear. The system further includes a jury linkage having a brace portion configured to be pivotally coupled to the drag brace assembly and a strut portion pivotally coupled to the brace portion and configured to be rotatably coupled to the shock strut.

Any of the foregoing embodiments may further include an upper drag spindle joint configured to rotatably couple the upper end of the drag brace assembly to the aircraft; a lower drag spindle joint configured to rotatably couple the lower end of the drag brace assembly to the shock strut; and a jury spindle joint configured to rotatably couple the strut portion of the jury linkage to the shock strut.

In any of the foregoing embodiments, the drag brace assembly includes an upper portion that includes the upper end, and a lower portion pivotally coupled to the upper portion and that includes the lower end.

In any of the foregoing embodiments, the drag brace assembly is configured to be in an extended position in which the upper portion and the lower portion extend in a straight line in response to the landing gear being in a down and locked position, and the drag brace assembly is configured to be in a folded position in which the upper portion and the lower portion form an angle with respect to each other that is less than 90 degrees in response to the landing gear being in a stowed position.

In any of the foregoing embodiments, the upper portion of the drag brace assembly, the lower portion of the drag brace assembly, and the brace portion of the jury linkage are pivotally coupled together at a single location.

In any of the foregoing embodiments, the upper portion of the drag brace assembly, the lower portion of the drag brace assembly, and the brace portion of the jury linkage are pivotally coupled together at the single location along a pivot axis.

Any of the foregoing embodiments may further include the shock strut having an outer cylinder configured to be coupled to the aircraft, and an inner cylinder configured to be coupled to at least one wheel assembly, wherein the lower end of the drag brace assembly is configured to be rotatably coupled to the outer cylinder of the shock strut and the strut portion is also configured to be rotatably coupled to the outer cylinder of the shock strut.

In any of the foregoing embodiments, the jury linkage is configured to be in an extended position in which a length of the jury linkage extends in a straight line in response to the landing gear being in a down and locked position and in response to the landing gear being in a stowed position.

In any of the foregoing embodiments, the system is configured to facilitate locking of the landing gear in a down and locked position and in a stowed position with only the drag brace assembly and the jury linkage.

Also disclosed is a system for use with landing gear of an aircraft. The system includes a drag brace assembly having an upper portion having an upper end configured to be rotatably coupled to the aircraft and a lower portion pivotally coupled to the upper portion and having a lower end configured to be rotatably coupled to a shock strut of the landing gear. The system further includes a jury linkage having a brace portion configured to be pivotally coupled to the drag brace assembly and a strut portion pivotally coupled to the brace portion and configured to be rotatably coupled to the shock strut.

Any of the foregoing embodiments may further include an upper drag spindle joint configured to rotatably couple the upper end of the drag brace assembly to the aircraft; a lower drag spindle joint configured to rotatably couple the lower end of the drag brace assembly to the shock strut; and a jury spindle joint configured to rotatably couple the strut portion of the jury linkage to the shock strut.

In any of the foregoing embodiments, the drag brace assembly is configured to be in an extended position in which the upper portion and the lower portion extend in a straight line in response to the landing gear being in a down and locked position, and the drag brace assembly is configured to be in a folded position in which the upper portion and the lower portion form an angle with respect to each other that is less than 90 degrees in response to the landing gear being in a stowed position.

In any of the foregoing embodiments, the upper portion of the drag brace assembly, the lower portion of the drag brace assembly, and the brace portion of the jury linkage are pivotally coupled together at a single location.

In any of the foregoing embodiments, the upper portion of the drag brace assembly, the lower portion of the drag brace assembly, and the brace portion of the jury linkage are pivotally coupled together at the single location along a pivot axis.

Any of the foregoing embodiments may further include the shock strut having an outer cylinder configured to be coupled to the aircraft, and an inner cylinder configured to be coupled to at least one wheel assembly, wherein the lower end of the drag brace assembly is configured to be rotatably coupled to the outer cylinder of the shock strut and the strut portion is also configured to be rotatably coupled to the outer cylinder of the shock strut.

In any of the foregoing embodiments, the jury linkage is configured to be in an extended position in which a length of the jury linkage extends in a straight line in response to the landing gear being in a down and locked position and in response to the landing gear being in a stowed position.

In any of the foregoing embodiments, the system is configured to facilitate locking of the landing gear in a down and locked position and in a stowed position with only the drag brace assembly and the jury linkage.

Also disclosed is a landing gear for use with an aircraft. The landing gear includes shock strut having an outer cylinder configured to be coupled to the aircraft, and an inner cylinder configured to be coupled to at least one wheel assembly. The landing gear further includes a drag brace assembly having an upper portion having an upper end configured to be rotatably coupled to the aircraft and a lower portion pivotally coupled to the upper portion and having a lower end configured to be rotatably coupled to the outer cylinder of the shock strut. The landing gear further includes a jury linkage having a brace portion configured to be pivotally coupled to the drag brace assembly and a strut portion pivotally coupled to the brace portion and configured to be rotatably coupled to the outer cylinder of the shock strut.

Any of the foregoing embodiments may further include an upper drag spindle joint configured to rotatably couple the upper end of the drag brace assembly to the aircraft; a lower drag spindle joint configured to rotatably couple the lower end of the drag brace assembly to the shock strut; and a jury spindle joint configured to rotatably couple the strut portion of the jury linkage to the shock strut.

In any of the foregoing embodiments, the jury linkage is configured to be in an extended position in which a length of the jury linkage extends in a straight line in response to the landing gear being in a down and locked position and in response to the landing gear being in a stowed position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
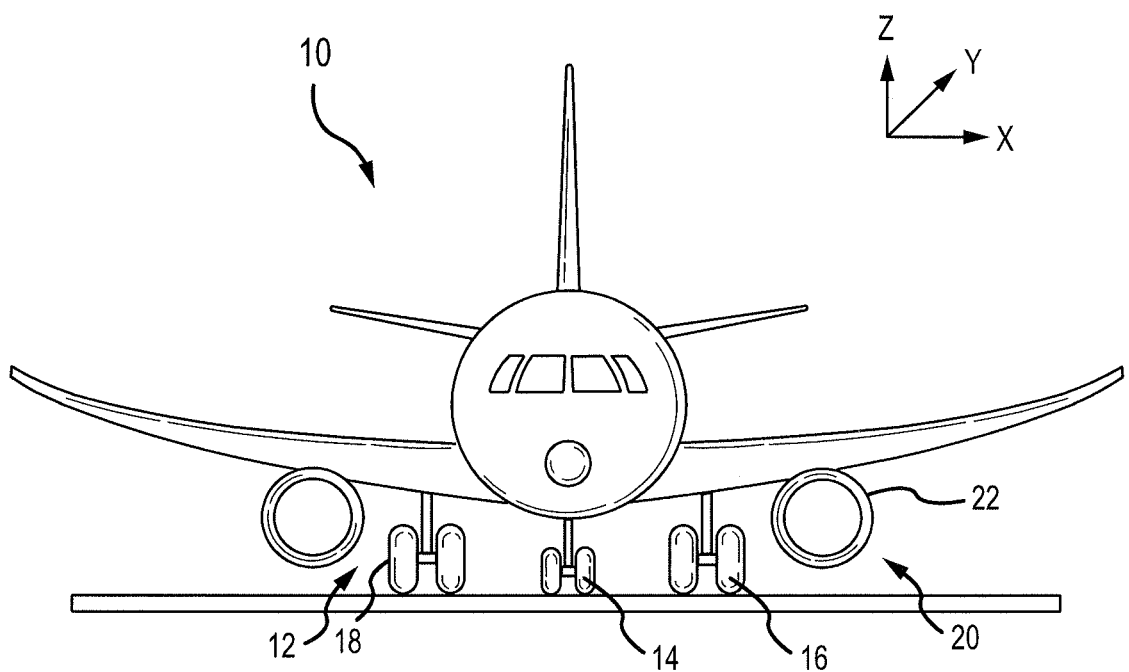
FIG. 1 illustrates an aircraft having multiple landing gear, in accordance with various embodiments.

Referring now to FIG. 1, an aircraft 10 in accordance with various embodiments may include multiple landing gear including a first landing gear 12, a second landing gear 14, and a third landing gear 16. In various embodiments, the first landing gear 12 and the third landing gear 16 may be main landing gear and the second landing gear 14 may be a nose landing gear. Each landing gear may include one or more wheel assemblies. For example, the first landing gear 12 includes two wheel assemblies 18. The landing gear 12, 14, 16 and the wheel assemblies 18 support the aircraft 10 in response to the aircraft 10 being parked and during taxi, takeoff, and landing of the aircraft 10.

The aircraft 10 may further include one or more gas turbine engine 20. The gas turbine engine 20 may be controlled by a pilot (such as by controlling a throttle in a cockpit) to generate thrust to accelerate the aircraft 10. The gas turbine engine 20 may include a nacelle 22.

An X-Y-Z axis is shown throughout the drawings to illustrate the relative orientation of various components.

Figure 2:
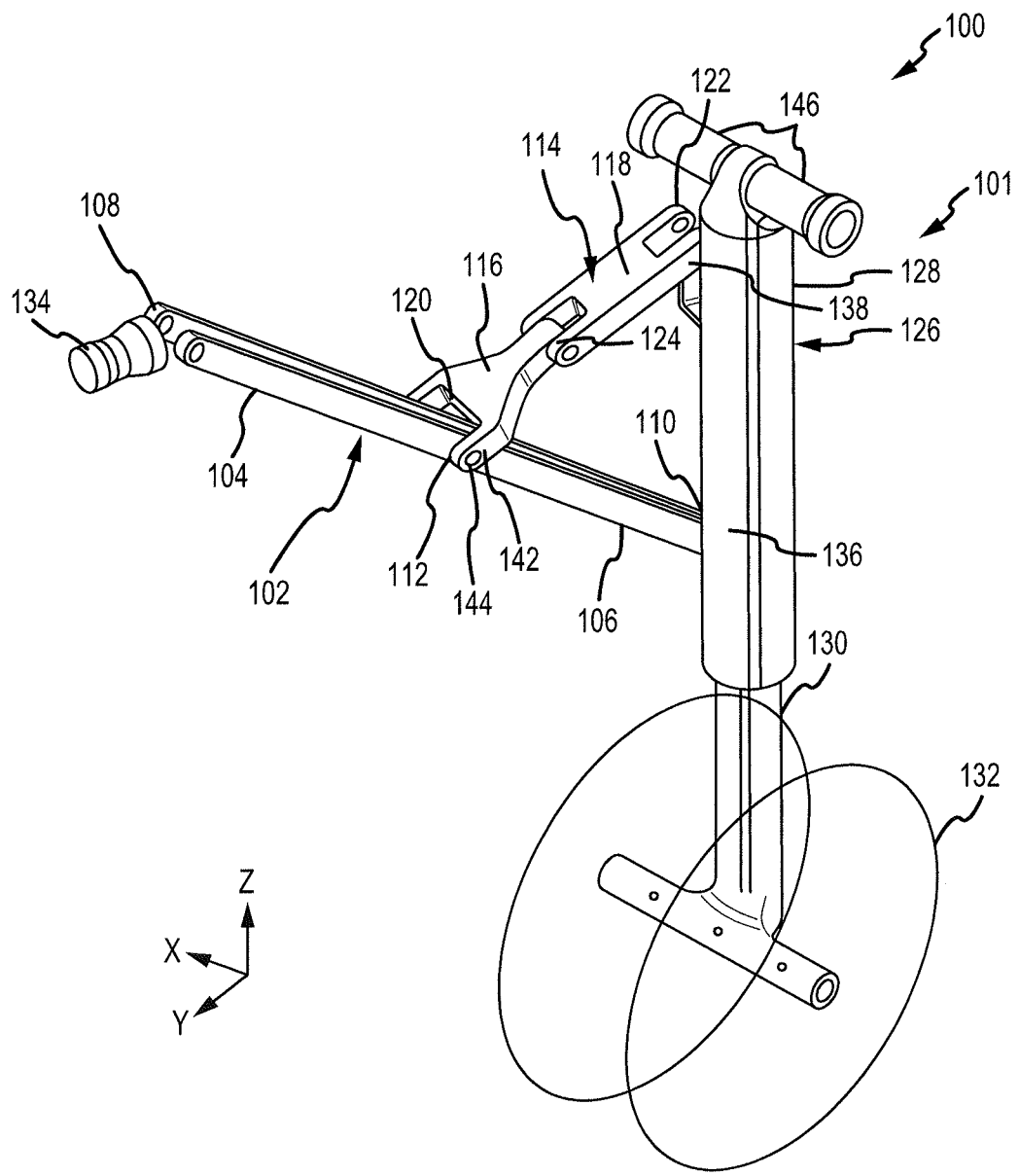
FIG. 2 illustrates a landing gear in a down and locked position, in accordance with various embodiments.
Figure 3:
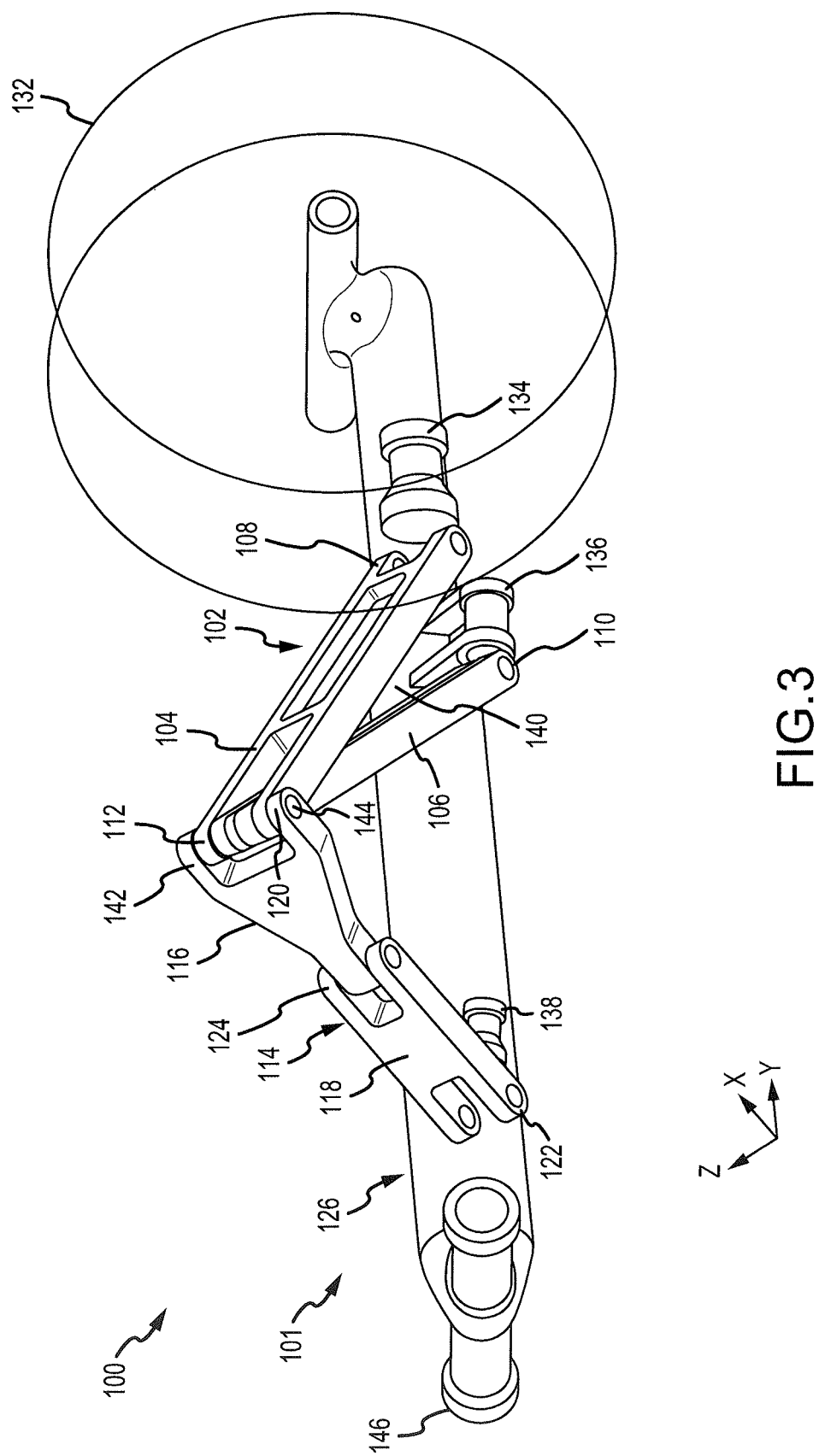
FIG. 3 illustrates the landing gear of FIG. 2 in a stowed position, in accordance with various embodiments.

Referring now to FIGS. 2 and 3, the landing gear 100 may include a system 101 for supporting the landing gear 100. The landing gear 100 may be used as any landing gear such as the landing gear 12, 14, or 16 of FIG. 1, a nose landing gear, a main landing gear, an auxiliary landing gear, or the like. The system 101 may notably facilitate locking of the landing gear 100 in a down and locked position (as shown in FIG. 2) and in a stowed position (as shown in FIG. 3) without use of an uplock, and with only the drag brace assembly 102 and the jury linkage 114. This desirably reduces complexity and part count of the landing gear 100, also reducing a total weight of the landing gear 100. The system 101 further facilitates storage of the landing gear 100 in a relatively small compartment.

The system 101 may include a drag brace assembly 102 having an upper brace 104 and a lower brace 106. The system 101 may further include a jury linkage 114 having a brace portion 116 and a strut portion 118. The system 101 may also include a shock strut 126 having an outer cylinder 128 and an inner cylinder 130.

The upper brace 104 of the drag brace assembly 102 may have an upper end 108 that is designed to be rotatably connected to an aircraft structure. The lower brace 106 of the drag brace assembly 102 may have a lower end 110 designed to be rotatably coupled to the shock strut 126. For example, the lower end 110 may be rotatably coupled to the outer cylinder 128 of the shock strut 126. The upper brace 104 of the drag brace assembly 102 may be pivotally coupled to the lower brace 106 at a center point 112.

The brace portion 116 of the jury linkage 114 may have a brace end 120 that is pivotally coupled to the drag brace assembly 102. In various embodiments, the brace end 120 may be pivotally coupled to the center point 112 of the drag brace assembly 102. In that regard, the brace end 120, the upper brace 104, and the lower brace 106 may each be pivotally coupled together at a single location 142. In various embodiments, the brace end 120, the upper brace 104, and the lower brace 106 may each be pivotally coupled together at the center point 112 using a single pin 144 at the single location 142. The single location 142 may be located along a pivot axis A-A'. The pivot axis A-A' may be an axis about which the elements may pivot, and may be defined as a single pin 144 axis.

The strut portion 118 of the jury linkage 114 may have a strut end 122 that is rotatably coupled to the shock strut 126. In various embodiments, the strut end 122 may be rotatably coupled to the outer cylinder 128 of the shock strut 126.

The brace portion 116 of the jury linkage 114 and the strut portion 118 of the jury linkage 114 may be pivotally coupled together at a jury center point 124. In that regard, the jury linkage 114 may be referred to as a reshaping jury linkage 114 as it may reform, restructure, or reshape as the landing gear 100 changes states between the down and locked position and the stowed position. A length P of the jury linkage 114 may be extended in a straight line in response to the landing gear being in the stowed position, thus locking the landing gear 100 in the stowed position. Likewise, the length P of the jury linkage 114 may be extended in a straight line in response to the landing gear being in the down and locked position, again locking the landing gear 100 in the down and locked position.

The inner cylinder 130 of the shock strut 126 may be at least partially located within the outer cylinder 128 of the shock strut 126. One or more wheel assembly 132 may be coupled to the inner cylinder 130 of the shock strut 126. In response to the wheel assembly 132 contacting a ground surface, the inner cylinder 130 may be further received by the outer cylinder 128 and displacing a fluid, thus providing shock absorption for the landing gear 100.

The outer cylinder 128 of the shock strut 126 may have a strut attachment 146. The strut attachment 146 may be designed to be coupled to a portion of a corresponding aircraft. In various embodiments, the strut attachment 146 may be pivotally coupled to the aircraft.

The rotatable connections or couplings between components may be facilitated using spindle joints. In particular, an upper drag spindle joint 134 may be located on, or coupled to, the upper end 108 of the drag brace assembly 102. The upper drag spindle joint 134 may likewise be coupled to a portion of the aircraft. In that regard, the drag brace assembly 102 may rotate freely relative to the portion of the aircraft to which the upper drag spindle joint 134 is attached.

A lower drag spindle joint 136 may be located on, or coupled to, the lower end 110 of the drag brace assembly 102. The lower drag spindle joint 136 may likewise be coupled to the outer cylinder 128 of the shock strut 126. In that regard, the drag brace assembly 102 may rotate freely relative to the portion of the outer cylinder 128 to which the lower drag spindle joint 136 is attached.

A jury spindle joint 138 may be located on, or coupled to, the strut end 122 of the jury linkage 114. The jury spindle joint 138 may likewise be coupled to the outer cylinder 128 of the shock strut 126. In that regard, the jury linkage 114 may rotate freely relative to the portion of the outer cylinder 128 to which the jury spindle joint 138 is attached.

As referenced above, FIG. 2 illustrates the landing gear 100 in a down and locked position, and FIG. 3 illustrates the landing gear 100 in a stowed position. The jury linkage 114 may be positioned in a line (i.e., the brace portion 116 and the strut portion 118 may be aligned along a same axis) in response to the landing gear 100 being in the stowed position and in the down and locked position. The jury linkage 114 may be folded (i.e., may form two lines at an angle) during the transition from the stowed position to the down and locked position.

The drag brace assembly 102 may be positioned in a straight line (i.e., the upper brace 104 and the lower brace 106 may be aligned along a same plane, as defined by the three rotation axes defined by the spindle joints 134, 136, 138) in response to the landing gear 100 being in the down and locked position. The drag brace assembly 102 may be angled in response to the landing gear 100 being in the stowed position. In that regard and in response to the drag brace assembly 102 being angled, an angle 140 may exist between the upper brace 104 and the lower brace 106. In various embodiments, the angle 140 may be less than 180 degrees (i.e., between 0 degrees and 180 degrees), less than 90 degrees (i.e., between 0 and 90 degrees), less than 45 degrees (i.e., between 0 and 45 degrees), or the like.

As illustrated in the drawings, the plane of the landing gear 100 shifts as the landing gear 100 is changed between the down and locked position and the stowed position. In particular, the components of the landing gear 100 are aligned in the Y-Z plane in response to the landing gear being in the down and locked position. The plane of the components changes somewhat out of the Y-Z plane such that the components are aligned at least partially in the X-Y plane in response to the landing gear being in the stowed position. Such repositioning of the plane is facilitated by the reforming jury linkage 114 along with the rotatable couplings of the various components.

Figure 4:
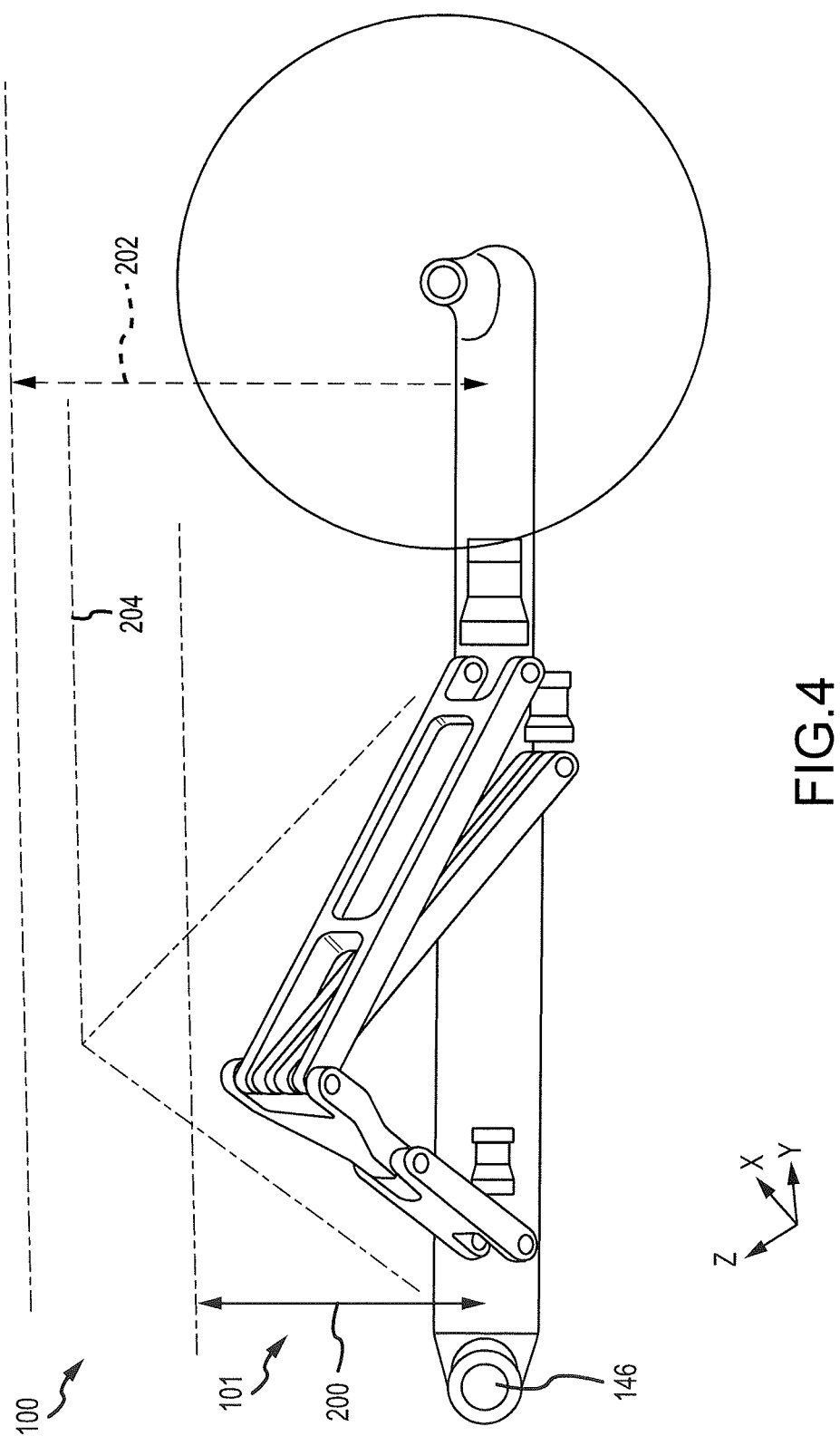
FIG. 4 illustrates a relative size of the landing gear of FIG. 2 in the stowed position, in accordance with various embodiments.

Because the plane of the landing gear 100 is at least partially removed from the Z-axis, the landing gear 100 may be stored in a smaller storage compartment (especially along the Z-axis) in response to being stowed than conventional landing gear. In particular and referring to FIG. 4, the system 101 facilitates the landing gear 100 extending for a distance 200 along the Z-axis in response to being in the stowed position. However, conventional landing gear remains along the Y-Z plane in response to being stowed (as shown by a line 204), and thus extends for a distance 202 which is significantly greater than the distance 200 of the landing gear 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for use with a landing gear of an aircraft, the system comprising:
    a drag brace assembly having an upper end configured to be rotatably coupled to the aircraft and a lower end configured to be rotatably coupled to a shock strut of the landing gear;
    a jury linkage having a brace portion configured to be pivotally coupled to the drag brace assembly and a strut portion pivotally coupled to the brace portion and configured to be rotatably coupled to the shock strut;
    an upper drag spindle joint configured to rotatably couple the upper end of the drag brace assembly to the aircraft;
    a lower drag spindle joint configured to rotatably couple the lower end of the drag brace assembly to the shock strut; and
    a jury spindle joint configured to rotatably couple the strut portion of the jury linkage to the shock strut.

2. The system of claim 1, wherein the drag brace assembly includes an upper portion that includes the upper end, and a lower portion pivotally coupled to the upper portion and that includes the lower end.

3. The system of claim 2, wherein the drag brace assembly is configured to be in an extended position in which the upper portion and the lower portion extend in a line in response to the landing gear being in a down and locked position, and the drag brace assembly is configured to be in a folded position in which the upper portion and the lower portion form an angle with respect to each other that is less than 90 degrees in response to the landing gear being in a stowed position.

4. The system of claim 2, wherein the upper portion of the drag brace assembly, the lower portion of the drag brace assembly, and the brace portion of the jury linkage are pivotally coupled together at a single location.

5. The system of claim 4, wherein the upper portion of the drag brace assembly, the lower portion of the drag brace assembly, and the brace portion of the jury linkage are pivotally coupled together at the single location along a pivot axis.

6. The system of claim 1, further comprising the shock strut having an outer cylinder configured to be coupled to the aircraft, and an inner cylinder configured to be coupled to at least one wheel assembly, wherein the lower end of the drag brace assembly is configured to be rotatably coupled to the outer cylinder of the shock strut and the strut portion is also configured to be rotatably coupled to the outer cylinder of the shock strut.

7. The system of claim 1, wherein the jury linkage is configured to be in an extended position in which a length of the jury linkage extends in a straight line in response to the landing gear being in a down and locked position and in response to the landing gear being in a stowed position.

8. The system of claim 1, wherein the system is configured to facilitate locking of the landing gear in a down and locked position and in a stowed position with only the drag brace assembly and the jury linkage.

9. A system for use with landing gear of an aircraft, the system comprising:
    a drag brace assembly having an upper portion having an upper end configured to be rotatably coupled to the aircraft and a lower portion pivotally coupled to the upper portion and having a lower end configured to be rotatably coupled to a shock strut of the landing gear;
    a jury linkage having a brace portion configured to be pivotally coupled to the drag brace assembly and a strut portion pivotally coupled to the brace portion and configured to be rotatably coupled to the shock strut;
    an upper drag spindle joint configured to rotatably couple the upper end of the drag brace assembly to the aircraft;
    a lower drag spindle joint configured to rotatably couple the lower end of the drag brace assembly to the shock strut; and
    a jury spindle joint configured to rotatably couple the strut portion of the jury linkage to the shock strut.

10. The system of claim 9, wherein the drag brace assembly is configured to be in an extended position in which the upper portion and the lower portion extend in a straight line in response to the landing gear being in a down and locked position, and the drag brace assembly is configured to be in a folded position in which the upper portion and the lower portion form an angle with respect to each other that is less than 90 degrees in response to the landing gear being in a stowed position.

11. The system of claim 9, wherein the upper portion of the drag brace assembly, the lower portion of the drag brace assembly, and the brace portion of the jury linkage are pivotally coupled together at a single location.

12. The system of claim 11, wherein the upper portion of the drag brace assembly, the lower portion of the drag brace assembly, and the brace portion of the jury linkage are pivotally coupled together at the single location along a pivot axis.

13. The system of claim 9, further comprising the shock strut having an outer cylinder configured to be coupled to the aircraft, and an inner cylinder configured to be coupled to at least one wheel assembly, wherein the lower end of the drag brace assembly is configured to be rotatably coupled to the outer cylinder of the shock strut and the strut portion is also configured to be rotatably coupled to the outer cylinder of the shock strut.

14. The system of claim 9, wherein the jury linkage is configured to be in an extended position in which a length of the jury linkage extends in a straight line in response to the landing gear being in a down and locked position and in response to the landing gear being in a stowed position.

15. The system of claim 9, wherein the system is configured to facilitate locking of the landing gear in a down and locked position and in a stowed position with only the drag brace assembly and the jury linkage.

16. A landing gear for use with an aircraft, the landing gear comprising:
- shock strut having an outer cylinder configured to be coupled to the aircraft, and an inner cylinder configured to be coupled to at least one wheel assembly a drag brace assembly having an upper portion having an upper end configured to be rotatably coupled to the aircraft and a lower portion pivotally coupled to the upper portion and having a lower end configured to be rotatably coupled to the outer cylinder of the shock strut;
- a jury linkage having a brace portion configured to be pivotally coupled to the drag brace assembly and a strut portion pivotally coupled to the brace portion and configured to be rotatably coupled to the outer cylinder of the shock strut;
- an upper drag spindle joint configured to rotatably couple the upper end of the drag brace assembly to the aircraft;
- a lower drag spindle joint configured to rotatably couple the lower end of the drag brace assembly to the shock strut; and
- a jury spindle joint configured to rotatably couple the strut portion of the jury linkage to the shock strut.

17. The landing gear of claim 16, wherein the jury linkage is configured to be in an extended position in which a length of the jury linkage extends in a straight line in response to the landing gear being in a down and locked position and in response to the landing gear being in a stowed position.

* * * * *